Jan. 12, 1971   E. D. WALLACE   3,553,904

WELD PREPARATION MACHINE

Filed April 30, 1968

ELVIS D. WALLACE
INVENTOR.

BY *G+ McCoy*
*William H. King*
ATTORNEY

United States Patent Office 3,553,904
Patented Jan. 12, 1971

3,553,904
WELD PREPARATION MACHINE
Elvis D. Wallace, Huntsville, Ala., assignor to the United States of America as represented by the Administrator of the National Aeronautics and Space Administration
Filed Apr. 30, 1968, Ser. No. 725,405
Int. Cl. B24b 23/02, 23/08; B23c 3/02
U.S. Cl. 51—170
8 Claims

ABSTRACT OF THE DISCLOSURE

A portable cutting machine for preparing the ends of piping to be welded in the field. The portable cutting machine includes a guiding table and roller assembly which provide proper location and orientation of the piping being prepared for end welding.

---

Figure 1:
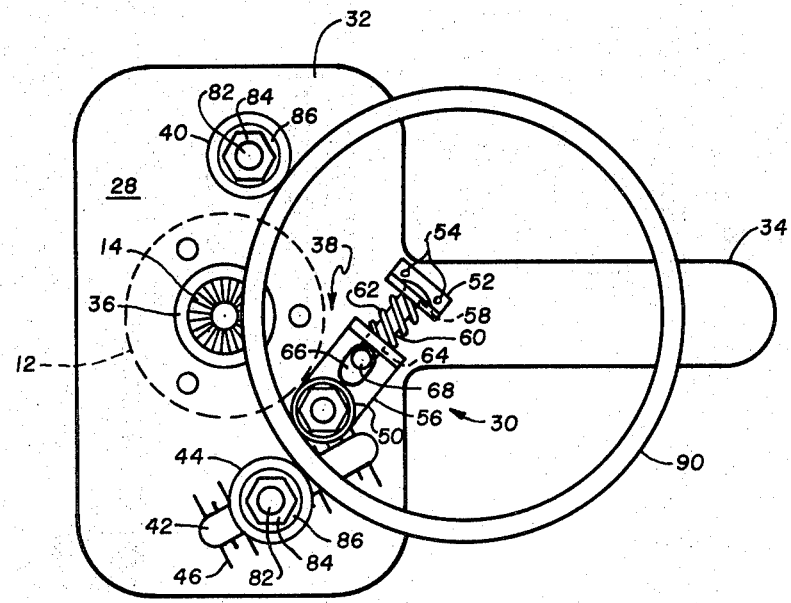

The invention described herein was made by an employee of the United States Government and may be manufactured and used by or for the Government for governmental purposes without the payment of any royalties thereon or therefor.

This invention relates generally to a cutting machine, and more particularly to a machine designed for preparation of the ends of piping or tubing for weld jointing where a particular geometrical configuration is required for the welding procedure.

Various methods and apparatus have been utilized in the past for preparing materials for a weld joint. Weld joint geometry preparation has generally been accomplished by hand filing or grinding, center guided-expanded chuck cutting equipment or by an engine lathe or milling machine. Obtaining accuracy and geometrical configuration by hand preparation is difficult and laborious, as well as extremely time consuming. Weld joint preparation with an expanding chuck center guided tool usually involves the use of heavy, cumbersome and relatively expensive equipment. The use of engine lathes or milling machines usually involves the transportation of the pipe or tubing to a machine shop which is expensive and time consuming. Furthermore, these known methods and devices generally require knowledge and experience for proper and safe use.

In order to overcome the disadvantages of the prior art, the instant invention contemplates a compact, simple and reliable device that is fully portable. A conventional routing machine is mounted in a casing associated with mount-table having a plurality of roller assemblies thereon for proper location and orientation of the member being prepared for end welding. A rack and pinion arrangement permits variation of the location of the cutter element of the routing machine with regard to the mount-table and, therefore, the member being prepared for welding.

It is an object of the instant invention to provide a simple, compact, reliable and completely portable weld preparation machine.

Another object of this invention is to provide a portable weld machine that is relatively inexpensive and capable of operation by persons having a minimum of skill and instruction and which will effect substantial economies in the fabrication and installation of many types of piping systems.

Still another object of the instant invention is to provide a unique roller guiding system which enables a completely portable routing machine to prepare the end of a member of a weld joint without reference to the centerline of the tubing or piping to be prepared.

A still further object of the instant invention is to provide a portable weld preparation machine consisting of a commercially available routing machine to which is attached a guiding table and roller assembly suitably arranged for the job requirements.

Yet another object of the instant invention is to provide a portable weld preparation machine utilizing a routing machine slidingly mounted in a casing with means for accurately locating the cutting surface of the router with regard to a mount-table attached to the casing and on which are mounted a fixed roller element, a resilient roller element, and an indexing roller element, for proper location of the member to be prepared for welding.

Figure 2:
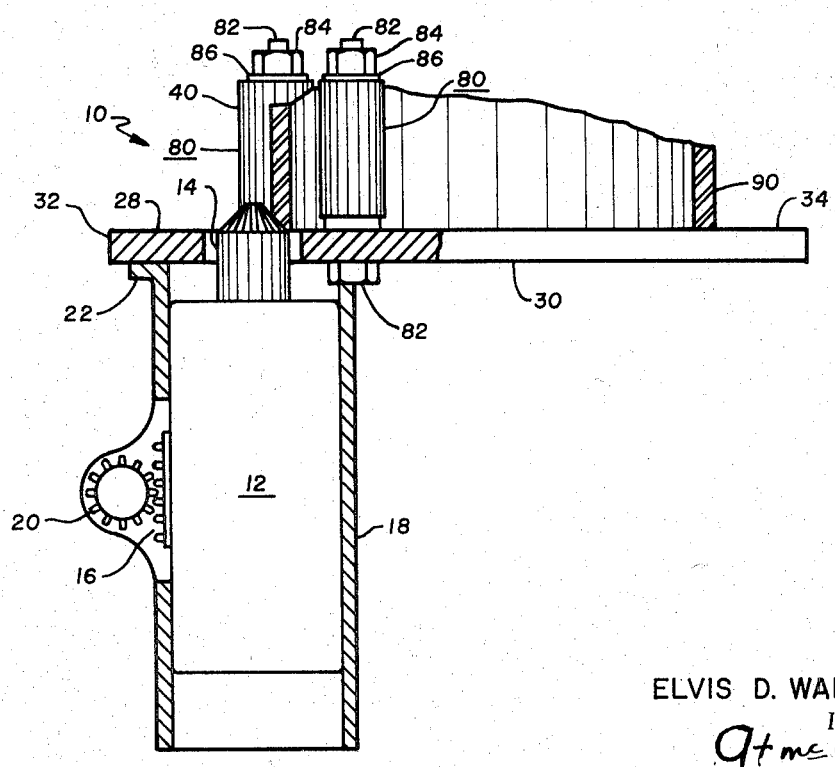

A more complete appreciation of the invention and many of the attendant advantages thereof will be readily apparent as the same becomes better understood by reference to the following description when considered in connection with the accompanying drawings wherein:

FIG. 1 is an end plan view of the instant invention with a tubular member in place for weld preparation; and FIG. 2 is a side elevational view partially in section, with portions omitted for clarity, of the invention shown in FIG. 1.

Referring now to the drawings wherein weld preparation machine 10 is shown to include a conventional and commercially available type router or grinding machine 12 having cutter attachment 14 extending from the end thereof. Router casing 18 is of a configuration and size to receive router 12 slidingly therein. Router 12 is provided on one side thereof with a rack 16 and casing 18 has pinion 20 mounted in one side thereof for mating engagement with rack 16 to provide accurate sliding adjustment of router 12 in casing 18 for a purpose to be more fully understood by the description hereinafter. Casing 18 has flange 22 on the end thereof from which cutter element 14 extends. Flange 22 is provided for rigid attachment of mount-table assembly 30.

Mount-table assembly 30 includes plate 28 having main section 32, which, as seen in FIG. 1, is of substantially flat rectangular form with arm 34 extending outwardly from one side. Section 32 of plate 28 has central opening 36 through which cutter attachment 14 extends in order to come in contact with pipe 90 which abuts plate 28. Spaced from central opening 36 is fixed roller element 40 which is one of the plurality of roller elements comprising roller guide assembly 38. Also spaced from central opening 36 and on the end of the main section 32 opposite to that of the location of fixed roller element 40 is adjustment slot 42 in which indexing roller element 44 is mounted. Index markings 46 along adjustment slot 42 provide for rapid and accurate location of indexing roller element 44 to permit accurate positioning of the member to be prepared for welding.

Referring now to FIG. 1, it is seen that resilient roller element 50 is attached at approximately the location of where arm 34 extends from main section 32 of plate 28. Resilient roller element 50 is attached by an assembly including mounted angle 52 attached rigidly to arm 34 by bolts or rivets 54. Angle 52 has one portion substantially parallel to plate 28 and an upright portion. Aperture 58 in the upright portion of angle 52 receives a bolt element 60 on which helical spring 62 is mounted with one end abutting the upright portion of angle 52.

Angle 56 is movable along and substantially parallel to main section 32 of plate 28 to permit resilient roller element 50 to vacillate. Aperture 64 in the upright portion of angle 56 receives the other end of bolt element 60 and permits helical spring 62 to have the other end thereof in abutting relationship to the upright portion of angle 56. Slot 66 in the portion of angle 56 which is parallel to plate 28 permits pin 68 which is rigidly secured to main section 32 of plate 28 to extend through slot 66 thereby locating angle 56 and roller element 50 mounted thereon to be accurately located in one direction.

Each of the roller elements, fixed roller element 40, indexed roller element 44 and resilient roller element 50, utilize rollers 80 which may be made from any type of conventional material; such, for example, as nylon or rubber. Rollers 80 are attached by bolts 82 extending centrally therethrough. Nuts 84 lock rollers 80 on bolts 82 to maintain rollers 80 in place. Washers 86, of conventional construction, can be utilized at the opposite ends of rollers 80 to permit substantially frictionless rotation of rollers 80 on the pipe, tubing, or other member having an end being prepared for welding.

OPERATION

The portable weld preparation machine of the instant invention operates by assembling the proper mount-table 30 and cutting or grinding tool 14 on router 12. Rack 16 and pinion 20 permit adjustment of router 12 and cutter 14 to the pipe or tube size and the desired configuration for the end of member 90 to be prepared for welding. Roller guide assembly 38 is adjusted to fit the pipe size by proper location of indexing roller element 44 in slot 42. The desired longitudinal depth of the cut is then attained by adjustment of rack 16 and pinion 20. The machine is then started and applied to the end of the pipe and the cutting or grinding operation is accomplished by cutter 14 encountering the end of member 90.

The above description of the operation of the instant invention provides a general example giving a clear indication of the simple, compact and completely portable character of the weld preparation machine. It is readily seen that the machine is inexpensive to manufacture and utilizes many conventional and commercially available elements. The selection of the size, speed, and power of the routing machine or grinder and the end configuration will be determined by the size and material of the piping or tubing to be worked. It is also readily observed that safety and convenience devices, such as chip deflectors and cutting tool guards may be added if required or desired. It is possible to utilize the instant invention on either pipe, tubing or on sheet material by merely properly locating indexing roller element 44. The machine can be operated by persons having a minimum of skill and instruction and the use of the machine should effect substantial economies in the fabrication and installation of many types of construction utilizing welded materials in the field. Furthermore, the machine performs its function efficiently without having to have reference to the centerline of the piping or tubing to be worked.

Obviously, many modifications and variations of the subject invention are possible in light of the above teachings. It is therefore to be understood that, within the scope of the appended claims, the invention may be practiced otherwise than as specifically described.

What is claimed as new and desired to be secured by Letters Patent of the United States is:

1. A portable weld preparation machine comprising: cutter means for grinding the end of a member to be prepared for welding; mount-table means attached to said cutter means for providing a flat and operational reference surface against which the end of the member to be prepared for welding abuts; and a roller guide assembly for orienting the member to be prepared in the proper position against said cutter means, whereby it is merely necessary to position the member against said mount-table means and in said roller guide assembly, commence operation of said cutter means and move the machine along the surface of the member being prepared for welding.

2. The portable weld preparation machine of claim 1 wherein said cutter means comprises: casing means for housing and slidingly receiving a motor and cutter attachment; and adjustment means for sliding the motor and cutter attachment with respect to said casing means and said mount-table means.

3. The portable weld preparation machine of claim 1 wherein said cutter means comprises: a casing having a flange for attachment of said mount-table means; a motor and cutter attachment slidingly mounted in said casing; rack means secured to said motor; pinion means mounted on said casing for engagement with said rack, whereby rotation of said pinion effects sliding movement of said motor and cutter attachment to vary the distance said cutter attachment extends beyond said mount-table means and thereby determine the configuration of the end of the member being prepared for welding.

4. The portable weld preparation means of claim 1 wherein said mount-table means comprises: a plate having a main section and an arm extending therefrom; a central opening in said plate main section for permitting said cutter means to extend therethrough; and means for attaching said plate to said cutter means.

5. The portable weld preparation machine of claim 1 wherein said roller-guide assembly comprises: a plurality of roller elements; at least one of said roller elements being fixed; and at least another one of said roller elements being adjustable in order to accurately locate the member to be prepared for welding with respect to said cutter means.

6. The weld preparation machine of claim 1 wherein said roller-guide assembly comprises: a plurality of roller elements mounted on said mount-table means; at least one of said roller elements fixedly mounted on said mount-table means; at least another of said roller elements adjustably mounted on said mount-table means in spaced relation to said fixed roller element; a further of said roller elements resiliently mounted on said mount-table means.

7. The portable weld preparation machine of claim 4 wherein said roller-guide assembly comprises: a plurality of roller elements; at least one of said roller elements fixedly mounted on said plate in spaced relation to said central opening; another of said roller elements adjustably mounted on said plate in spaced relation to said one roller element and said central opening; a further of said roller elements resiliently mounted on said plate in spaced relation to said one and another roller elements and said central opening.

8. The portable weld preparation machine of claim 7 wherein said resiliently mounted roller element comprises: a roller mounted for rotation on an angle member; a slot in the flange of said angle member upon which said roller is mounted; an aperture in the upright flange of said angle member; an upright member mounted on said plate; a bolt extending from said upright member through said aperture in said upright flange; and a helical spring over said bolt and operable against said upright member and said upright flange.

References Cited

UNITED STATES PATENTS

| 2,247,344 | 6/1941 | Fuglie | 51—2410 |
| 3,067,651 | 12/1962 | Hogden | 51—2410 |
| 3,187,361 | 6/1965 | Wheeler | 51—241X |

DONALD G. KELLY, Primary Examiner

U.S. Cl. X.R.

90—11, 12